Dec. 15, 1964
P. Y. A. F. SANDRE
3,161,018
COMBINED TURBOJET-RAMJET ENGINE
Filed Nov. 14, 1960
4 Sheets-Sheet 1
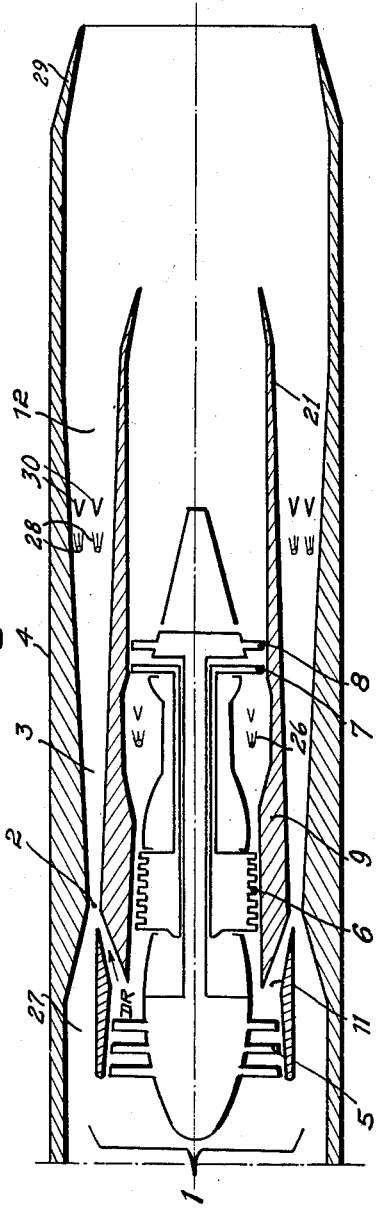
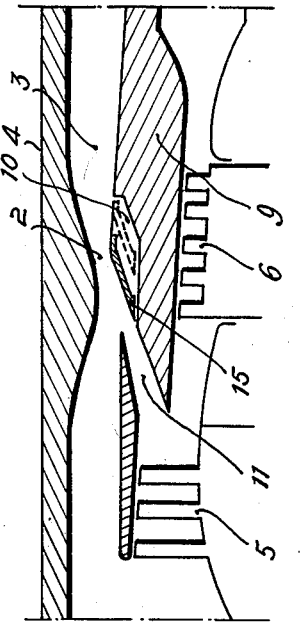
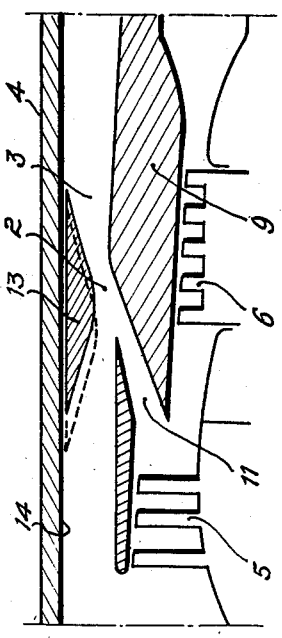

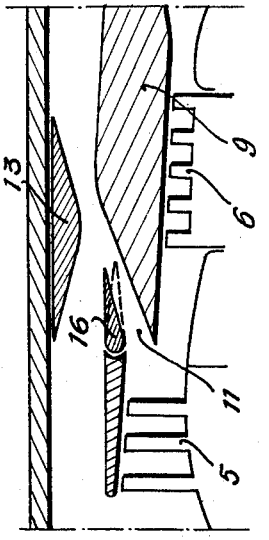
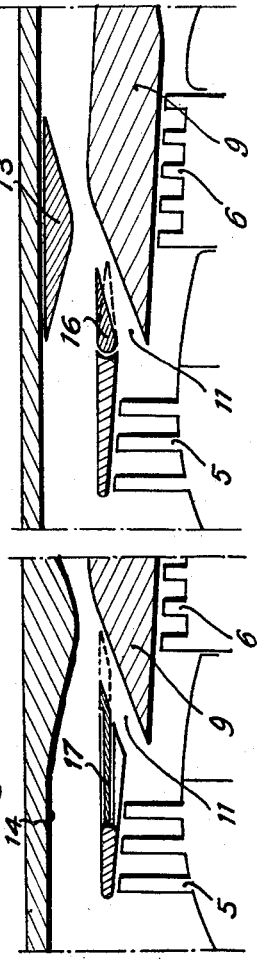
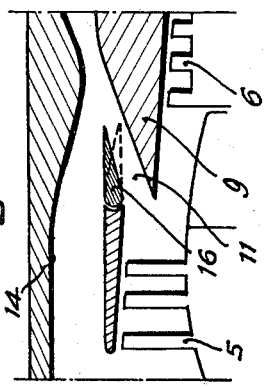
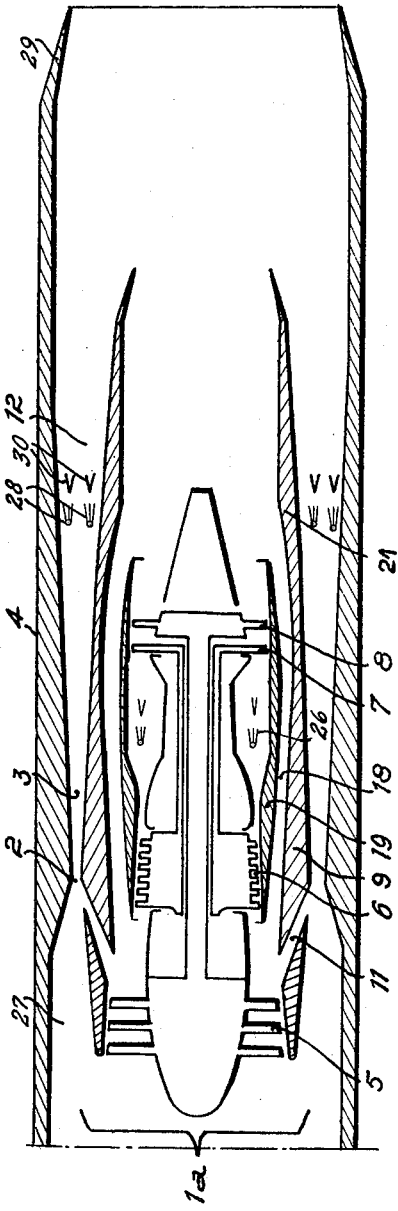

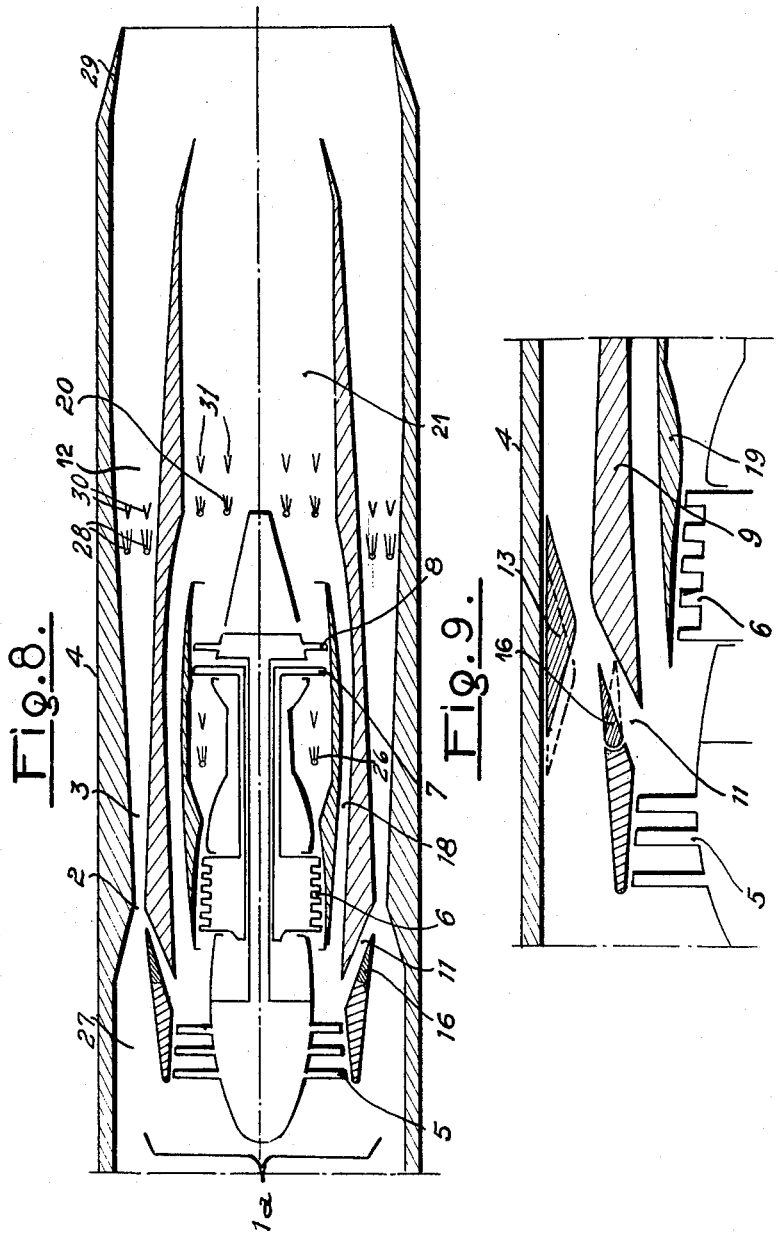

United States Patent Office 3,161,018
Patented Dec. 15, 1964

3,161,018
COMBINED TURBOJET-RAMJET ENGINE
Pierre Y. A. F. Sandre, Le Vesinet, France, assignor to Nord-Aviation, Société Nationale de Constructions Aeronautiques, Paris, France, a joint-stock company of France
Filed Nov. 14, 1960, Ser. No. 68,727
Claims priority, application France, July 11, 1960, 832,622
14 Claims. (Cl. 60—35.6)

For the propulsion of high-speed vehicles the combination of complementary jet engines such as the turbojet and the ramjet is now of established interest. Combined motors of this type have already been successfully developed, and various methods, such as the use in such combination of a turbojet of the by-pass type, have already been proposed to improve their efficiency.

At low flying speed a ramjet engine has no efficiency. In order to overcome this drawback it has been proposed at low speeds to shut off the ramjet by closing its inlet by means of a mechanical device. It has even been proposed to utilize the combustion chamber of the ramjet when its inlet has been closed by supplying this combustion chamber with compressed air furnished by the compressor of the turbojet. At high flying speeds communication between the turbojet and the ramjet is cut and the normal feed to the ramjet is re-established.

The present invention, relating to a combined turbojet-ramjet engine in which the turbojet is of the by-pass type, is essentially characterized by the fact that the air compressed by the compressor of the turbojet and the air which has not been mechanically compressed are both introduced simultaneously into an annular space surounding the turbojet and are intimately mixed therein. The homogeneous mixture thus formed is thereafter heated in an annular combustion chamber prior to being ejected through the exhaust nozzle placed at the rear of the combined engine.

To this end, the by-pass turbojet portion of the combined turbojet-ramjet engine according to the invention is partially surrounded by an annular chamber of appropriate shape, hereinafter referred to as the air mixing chamber, at the inlet of which are simultaneously introduced at least a portion of the secondary air stream of the turbojet and air which has not been mechanically compressed.

This latter stream, hereinafter referred to as the direct air stream, flows along the front outside portion of the turbojet and directly into the mixing chamber by an annular duct surrounding the front portion of the turbojet.

In order to mix these two air masses of different characteristics with the greatest possible efficiency, and to reduce to the minimum the length of travel necessary in order to obtain a homogeneous mixture, the mixing chamber should advantageously comprise a constricted section which gives it the profile of an annular injector. In order to facilitate the mixing, it is also advantageous to introduce the secondary stream of the turbojet into the mixing chamber through a series of separate passages rather than by a single annular passage.

At the rear of the mixing chamber, the combined turbojet-ramjet engine according to the invention comprises an annular combustion chamber surrounding the rear portion of the turbojet. This combustion chamber is equipped with conventional devices, injectors, flame holders, etc. which enable the combustion in the mixture furnished by the mixing chamber to be maintained.

In the combined turbojet-ramjet engine according to the invention, the by-pass turbojet and the ramjet are so strictly interconnected that it is no longer possible to distinguish the circuitry of the direct air stream from the circuitry of the secondary air stream of the turbojet as from the mixing chamber.

The present invention also provides means for regulating either simultaneously or independently the two parameters comprising:

(a) The ratio of the cross-sectional area of the annular duct with respect to the cross-sectional area in the same plane of the passage means at the region where the above-mentioned direct air stream and secondary airstream of the turbojet meet; and (b) The cross-sectional area of the narrowest section in the above-mentioned restriction means, hereinafter called the throat portion of said restriction means.

These regulating means may be comprised by articulated flaps, mobile annular elements adapted to slide longitudinally, and all such equivalent members.

The by-pass turbojet of the improved combined turbojet-ramjet engine in accordance with the invention can be provided with an after-burning system.

The presently-disclosed improved combined turbojet-ramjet engine offers the following advantages over known combined engines:

From idling conditions on the ground the secondary air stream of the turbojet causes, by its ejector effect, a notable ramjet air stream. This results in an increase in the total rate of flow of air in the combined motor and, consequently, a notable reduction in the ejection velocity of the gases and thus a reduction in the noise produced by the engine.

In cruising subsonically, the specific consumption remains moderate. It is of the order of that for an ordinary turbojet.

At high supersonic velocities, the excellent characteristics of the ramjet are conserved.

The means for adjusting the rates of flow of the streams to be mixed and the means for regulating the section of the mixing chamber enable optimum characteristics to be obtained for the mix under all conditions of operation for the engine.

The means for adjusting the rates of flow of the streams admitted into the mixing chamber act in particular on the flow of the secondary air stream of the turbojet. They constitute in this way a control parameter for the turbojet and can be controlled by the system for regulating the turbojet. They thus replace the classical means previously used for adjusting the outlet section of the turbojet while having the advantage of being entirely situated in the cold zone of the engine.

Finally, the combined turbojet-ramjet engine according to the invention can pass from functioning as a by-pass turbojet to functioning as a combined turbojet-ramjet engine without any discontinuity either in the functioning of the turbojet or in the supply to the annular combustion chamber. This effect is achieved by the continuous variation of the ratio of the rates of flow of the two streams admitted into the mixing chamber without it being necessary to provide the jet pipe for the primary stream of the turbojet with a variable outlet. At high supersonic velocities the engine can function as a pure ramjet with the turbojet portion being stopped.

Further features and advantages will become apparent from the following description of the preferred embodiments of the invention, with reference to the accompanying diagrammatic drawings in which all of the figures are sections along the longitudinal axis and represent:

FIGURE 1, a combined turbojet-ramjet engine in accordance with the invention wherein the whole of the turbojet by-pass air stream is sent into the annular mixing chamber without adjustment means.

FIGURE 2, a combined turbojet-ramjet engine in accordance with the invention similar to that of FIGURE 1 but wherein a portion only of the turbojet by-pass air stream is directed, without there being adjustment means, into the annular mixing chamber, the remainder of said by-pass air stream being directed into the jet pipe of the primary stream.

FIGURES 3 and 4 each show a mobile annular member enabling the constricted cross-sectional area of the mixing chamber to be varied.

FIGURES 5 and 6 show respectively an articulated control flap and a slideable control collar adapted to vary the cross-sectional areas of the passages for the two streams to be mixed at their entry into the mixing chamber.

FIGURE 7 shows the combination of an articulated control flap and a mobile annular restriction member to simultaneously vary the constricted cross-sectional area of the mixing chamber and the cross-sectional areas of the passages for the two streams at their entry into the mixing chamber.

FIGURE 8 shows a combined engine similar to that shown in FIGURE 2 but provided with an after-burning system.

FIGURE 9 shows a combination similar to that of FIGURE 7, but adapted for operation with the engine of FIGURE 2 or 8.

Figure 13:
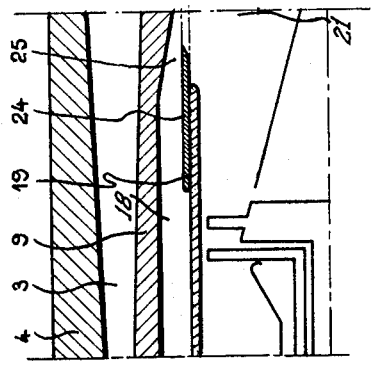
Figure 12:
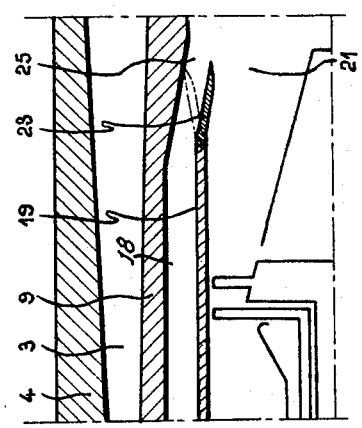
Figure 11:
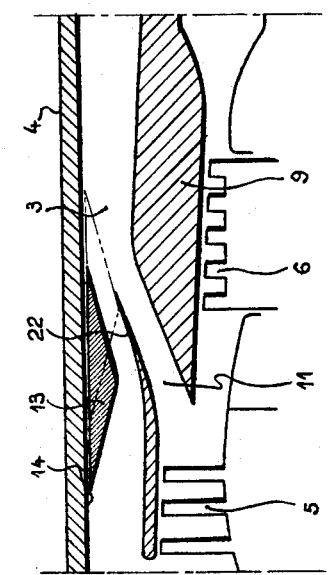
Figure 10:
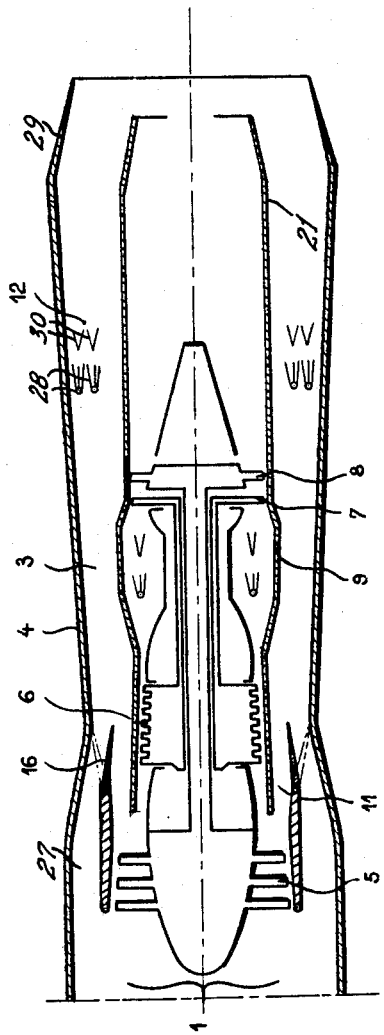

FIGURES 10 and 11 each show a system adapted to provide full control over the direct air stream; and FIGURES 12 and 13 each show a system adapted to provide full control over the outlet of the by-pass duct of the turbojet at its jet pipe.

In FIGURE 1 of the drawings the by-pass turbojet, which latter is indicated in general by the reference numeral 1 comprises essentially a low-pressure compressor 5, a high-pressure compressor 6, being respectively driven by low-pressure turbine 8 and high-pressure turbine 7, and a combustion system 26, the whole being surrounded by a casing 9 extended by a jet pipe 21 whose outlet section is fixed.

The casing 9 is surrounded by an annular space of which a part constitutes the annular mixing chamber 2–3 having the shape of an annular injector by virtue of the constricted section 2. The whole of the secondary air stream of the turbojet is sent into the mixing chamber 2–3 through passage 11 provided in the casing 9 of the turbojet. The direct air stream passes to the mixing chamber 2–3 through the annular duct 27 surrounding the front portion of the turbojet 1.

The secondary air stream of the turbojet 1 and the direct air stream are intimately mixed in mixing chamber 2–3. The homogeneous mixture resulting supplies the annular combustion chamber 12 surrounding the rear portion of turbojet 1. The fuel is introduced into the combustion chamber 12 by means of injectors 28 associated with flame-holders 30.

The whole of the combined engine is surrounded by an outer cowling 4 which forms the external wall of the duct 27, the mixing chamber 2–3 and the combustion chamber 12.

All of the gas streams passing through the combined engine exhaust by exit nozzle 29 extending the rear of outer cowling 4.

FIGURE 2 illustrates a turbojet 1a in which only a portion of the by-pass air stream is directed into the mixing chamber 2–3, the remaining portion being directed in the usual manner into the jet pipe 21 of the turbojet, downstream of turbines 7 and 8, through a by-pass duct 18. A turbojet by-pass casing 19 is in this case necessary.

FIGURE 3 shows a mobile annular restriction member 13 slidable longitudinally along the inner surface 14 of the outer cowling 4, the cross-section of said mobile annular restriction member 13 preferably having a triangular shape with a rounded apex, such that a displacement of this member varies the constricted member 2 of the mixing chamber.

The adjusting means illustrated in FIGURE 4 are adapted to fulfill the same function as those illustrated in FIGURE 3. They comprise a mobile annular collar 15 slidable longitudinally along an annular recess 10 formed in the casing 9 of the turbojet, thus causing the shape of one of the walls of the constricted area 2 to be deformed.

In FIGURE 5 the means for varying the cross-sectional areas of the passageways for the secondary stream of the turbojet and the direct air stream at the inlet to the mixing chamber are constituted by means of movable flaps, such as articulated control flap 16 distributed around the entire periphery of the turbojet casing 9. The flaps 16, whose trailing edges are tapered down, have a profile designed to ensure simultaneous flow with the minimum of loss, for the two streams towards the mixing chamber 2–3. Their specific position, at the junction of the two streams entering into the mixing chamber, enable these flaps to have an effect on the rates of flow of the two streams. Specifically they can control the rate of flow of the secondary stream of the turbojet and act in consequence on the working parameters of the turbojet such as the velocity of rotation of the compressor, the turbine inlet temperatures, etc. They therefore fulfill the same role as a device adjusting the outlet section of the jet pipe 21 which they can advantageously replace.

The same result is obtained by means of the slidable control collar 17 movable longitudinally in the casing 9, as illustrated in FIGURE 6.

The combination of adjustments of the constricted section 2 and the cross-sections of the secondary stream of the turbojet and the direct air stream at the inlet to the mixing chamber is shown in FIGURE 7, wherein movable flaps such as articulated control flap 16 and a mobile annular restriction member such as 13 can both be operated for this purpose.

In FIGURE 8, the turbojet 1a of the combined engine according to the invention is equipped with a conventional after-burning system having injectors 20 and flame-holders 31 in the region where the turbojet primary air stream mixes with by-pass air stream from the by-pass duct 18. Articulated control flaps 16 enable the portion of the turbojet by-pass air stream which is directed into the annular mixing chamber 2–3 to be regulated.

When after-burning is not operated, interconnecting annular passage 11 is either closed or open to allow a part of the turbojet by-pass air stream to flow into the mixing chamber 2–3. The fixed outlet cross-sectional area of the jet pipe 21 of the turbojet 1a is adapted to this arrangement.

When after-burning is operated, either complete or partial, the interconnecting annular passage 11, which is then open, passes a more or less appreciable amount of the turbojet by-pass air stream into the mixing chamber 2–3, such that the volume flowing through the outlet of the jet pipe 21 is always correlated to the preset cross-sectional area thereof. The present invention provides for the adjustment of the cross-sectional area of interconnecting annular passage 11 to be controlled by the parameter or parameters of the turbojet which normally control the cross-sectional area of the outlet of the jet pipe of the turbojet.

Accordingly, irrespective of the after-burning rate, it becomes possible to keep a constant temperature at the inlet to the turbines, even although the cross-sectional area of the outlet of the turbojet jet pipe is fixed.

The means described above adapted to adjust the constricted section 2 of the mixing chamber 2–3 are of course applicable to the present embodiment. Likewise, the articulated control flaps 16 can be replaced by other control means having the same function.

In FIGURE 9 is shown, by way of example, one embodiment of the control means applicable to the combined engine illustrated in FIGURE 7 or 8. These means are comprised by a mobile annular restriction member 13, identical with that previously described and shown in FIGURE 2, and by articulated control flaps 16 capable of completely shutting off the interconnecting annular passage or passages 11.

FIGURE 10 illustrates a specific embodiment of the means for regulating the turbojet by-pass air stream through the interconnecting annular passage 11 in a combined engine such as illustrated in FIGURE 1, wherein the whole of the turbojet by-pass air stream is directed through the mixing chamber 2–3. These regulating means are in this case embodied by articulated control flaps 16 whose size and freedom is such that their trailing edges can be applied against the inner surface 14 of the outer cowling 4, thus preventing the direct air stream to pass into mixing chamber 2–3.

Under these conditions, the combined engine may operate:

Either as the combined turbojet-ramjet engine described above if the direct air stream from annular duct 27 is allowed into the mixing chamber 2–3;

Or as a by-pass turbojet with after-burning of its by-pass air stream if the direct air stream supply to the mixing chamber is shut off.

The same result can be obtained by locating the means for controlling the direct air stream supply to the mixing chamber so that these means completely obstruct the annular air duct 27. The mobile annular restriction member 13 shown in FIGURE 11 can, by sliding along the inner surface 14 of the outer cowling 4, engage with a flared fore-part 22 of the turbojet casing, in front of the interconnecting annular passage 11, thus completely blocking the annular air duct 27.

It is also possible, with reference to the combined turbojet-ramjet engine illustrated in FIGURES 2 and 8, to provide control means for the by-pass air stream of the turbojet directed towards its jet pipe 21. These means comprise a ring of articulated adjustment flaps 23 as illustrated in FIGURE 12, articulated on the downstream extremity of the turbojet by-pass casing 19 separating the primary and by-pass air streams in the turbojet, or by a slidable adjustment collar 24 displaceable along the downstream extremity of the turbojet by-pass casing 19 as illustrated in FIGURE 13, the internal surface of the jet pipe 21 being convergent in this case over the area adjacent to the full travel of said slidable adjustment collar 24.

Either of these means enables the ratio of the cross-sectional areas of the turbojet jet pipe 21 and the variable outlet 25 of the turbojet by-pass duct 18 to be modified at the start of the zone wherein their static pressures are balanced, and hence the ratio of the rates of flow of the two corresponding air streams to be varied.

For a fixed rate of flow of the primary turbojet air stream, the joint action of the control means at the outlet of interconnecting annular passage 11 (FIGURES 5 and 6) and of the control means for the ratio of cross-sectional areas of the turbojet jet pipe 21 and the variable outlet 25 of the turbojet by-pass duct 18 (FIGURES 12 and 13) enables the whole of the turbojet by-pass air stream to be controlled at will. It is thus possible to obtain the optimum use of the low-pressure compressor 5 irrespective of the proportion of the turbojet by-pass air stream which it is desired to feed into the mixing chamber, this proportion being, for example, set by the rate of after-burning in the jet pipe 21.

The various embodiments as described above result in the following advantages:

All movable parts, except for the control means at the common exit nozzle are located upstream of the high-temperature zones. After-burning can be used in the turbojet despite its fixed outlet section.

Regulation of the constricted section 2 of the mixing chamber and of the cross-sectional passage of the two air streams at the mixing chamber inlet enable, in all cases of operation, optimum characteristics of the mix and optimum use of the turbojet to be obtained. The advanced location in the ramjet air duct of this mixing region will result in good homogeneity of the mix before entering the combustion chamber.

The device for regulating the cross-sectional area of the outlet of the turbojet jet pipe is dispensed with.

Although the present invention has been described in conjunction with preferred embodiments, it is to be understood that modifications and variations may be resorted to without departing from the spirit and scope of the invention, as those skilled in the art will readily understand.

Such modifications and variations are considered to be within the purview and scope of the invention and appended claims.

I claim:

1. Combined turbojet-ramjet comprising: (a) a by-pass turbojet, including in series flow within an annular casing, compressor means, a combustion system, turbine means, a jet pipe, (b) a primary air stream passing directly through said compressor means, said combustion system, said turbine means, to said jet pipe, (c) a secondary air stream passing through at least a part of said compressor means and by-passing said combustion system and said turbine means, (d) an outer annular cowling coaxial with said turbojet casing, the forward extension of said cowling forming a single air inlet to said combined engine, (e) an annular space between said outer annular cowling and said annular casing of said by-pass turbojet, said annular space including in series flow an annular duct, an air mixing chamber, said air mixing chamber having constriction means at its upstream end adjacent said annular duct, said constriction means including a throat portion, a combustion chamber surrounding said jet pipe of said by-pass turbojet, (f) an exit nozzle terminating the downstream end of said outer annular cowling, beyond the extremity of said jet pipe, (g) a direct air stream passing through said annular duct to said mixing chamber, and passage means through said annular casing of said by-pass turbojet having an outlet situated between said annular duct and said air mixing chamber, directing at least a portion of said secondary air stream towards said constriction means in said air mixing chamber, so that said direct air stream and said portion of said secondary air stream intimately mix in said air mixing chamber before passing into said combustion chamber.

2. Combined turbojet-ramjet comprising: (a) a by-pass turbojet, including in series flow within an annular casing, compressor means, a combustion system, turbine means, a jet pipe, (b) a primary air stream passing directly through said compressor means, said combustion system, said turbine means, to said jet pipe, (c) a secondary air stream passing through at least a part of said compressor means and by-passing said combustion system and said turbine means, (d) an outer annular cowling coaxial with said turbojet casing, (e) an annular space between said outer annular cowling and said annular casing of said by-pass turbojet, said annular space including in series flow an annular duct, an air mixing chamber, said air mixing chamber having constriction means at its upstream end adjacent said annular duct, said constriction means including a throat portion, a combustion chamber surrounding said jet pipe of said by-pass turbojet, (f) an exit nozzle terminating the downstream end of said outer annular cowling, beyond the extremity of said jet pipe, (g) a direct air stream passing through said annular duct to said mixing chamber, (h) passage means through said annular casing of said by-pass turbojet having an outlet situated between said annular duct and said air mixing chamber, directing at least a portion of said secondary air stream towards said constriction means in said air mixing chamber, whereby said direct air stream and said portion of said secondary air stream intimately mix in said air mixng chamber before passng into said combustion chamber, said turbojet-ramjet having two parameters comprising: (i) the ratio of the cross-sectional area of said annular duct with respect to the co-planar cross-sectional area of said passage means at said outlet of said passage means, and (j) the cross sectional area of said throat portion of said restriction means, and (k) means regulating at least one of said parameters.

3. Combined turbojet-ramjet engine in accordance with claim 2, wherein said means regulating for at least one of said two parameters include: (l) articulated flaps located adjacent said outlet of said passage means, said articulated flaps being mounted to pivot about the upstream edge of said outlet of said passage means.

4. Combined turbojet-ramjet engine in accordance with claim 2, wherein said means regulating at least one of said two parameters include: (m) a slideable collar adapted for longitudinal displacement with respect to said casing of said by-pass turbojet adjacent said passage means and located at either edge of said outlet of said passage means.

5. Combined turbojet-ramjet engine in accordance with claim 2, wherein said means regulating at least one of said two parameters include: (n) a slideable collar adapted for longitudinal displacement with respect to said casing of said by-pass turbojet adjacent said passage means and located at the downstream edge of said outlet of said passage means.

6. Combined turbojet-ramjet engine in accordance with claim 2, wherein said means regulating at least one of said two parameters include: (o) a mobile annular restriction member slideable longitudinally along the inner surface of said outer annular cowling, the cross-section of said mobile annular restriction member having a substantially triangular shape in profile with a rounded obtuse apex.

7. Combined turbojet-ramjet comprising: (a) a by-pass turbojet, including in series flow within an annular casing, compressor means, a combustion system, turbine means, a jet pipe, (b) a primary air stream passing directly through said compressor means, said combustion system, said turbine means, to said jet pipe, (c) a secondary air stream passing through at least a part of said compressor means and by-passing said combustion system and said turbine means, (d) an annular by-pass duct located within and co-axial with said annular casing of said by-pass turbojet, directing the remainder of said secondary air stream of said by-pass turbojet directly to said jet pipe, (e) an outer annular cowling coaxial with said turbojet casing, the forward extension of said cowling forming a single air inlet to said combined engine, (f) an annular space between said outer annular cowling and said annular casing of said by-pass turbojet, said annular space including in series flow an annular duct, an air mixing chamber, said air mixing chamber having constriction means at its upstream end adjacent said annular duct, said constriction means including a throat portion, a combustion chamber surrounding said jet pipe of said by-pass turbojet, (g) an exit nozzle terminating the downstream end of said outer annular cowling, beyond the extremity of said jet pipe, (h) a direct air stream passing through said annular duct to said mixing chamber, (i) passage means through said annular casing of said by-pass turbojet having an outlet situated between said annular duct and said air mixing chamber, directing a portion of said secondary air stream towards said constriction means in said air mixing chamber, whereby said direct air stream and said portion of said secondary air stream intimately mix in said air mixing chamber before passing into said combustion chamber.

8. Combined turbojet-ramjet comprising: (a) a by-pass turbojet, including in series flow within an annular casing, compressor means, a combustion system, turbine means, a jet pipe, (b) a primary air stream passing directly through said compressor means, said combustion system, said turbine means, to said jet pipe, (c) a secondary air stream passing through at least a part of said compressor means and by-passing said combustion system and said turbine means, (d) an annular by-pass duct located within and co-axial with said annular casing of said by-pass turbojet, directing the remainder of said secondary air stream of said by-pass turbojet directly to said jet pipe, (e) an outer annular cowling coaxial with said turbojet casing, the forward extension of said cowling forming a single air inlet to said combined engine, (f) an annular space between said outer annular cowling and said annular casing of said by-pass turbojet, said annular space including in series flow an annular duct, an air mixing chamber, said air mixing chamber having constriction means at its upstream end adjacent said annular duct, said constriction means including a throat portion, a combustion chamber surrounding said jet pipe of said by-pass turbojet, (g) an exit nozzle terminating the downstream end of said outer annular cowling, beyond the extremity of said jet pipe, (h) a direct air stream passing through said annular duct to said mixing chamber, (i) passage means through said annular casing of said by-pass turbojet having an outlet situated between said annular duct and said air mixing chamber, directing a portion of said secondary air stream towards said constriction means in said air mixing chamber, whereby said direct air stream and said portion of said secondary air stream intimately mix in said air mixing chamber before passing into said combustion chamber, (j) and control means located at the extremity of said by-pass duct situated adjacent said jet pipe, adjusting the cross sectional area of said by-pass duct at said jet pipe.

9. Combined turbojet-ramjet in accordance with claim 8, wherein said control means include: (k) articulated flaps.

10. Combined turbojet-ramjet in accordance with claim 8, wherein said control means include: (l) a longitudinally slideable annular collar.

11. Combined turbojet-ramjet comprising (a) a by-pass turbojet, including in series flow within an annular casing, compressor means, a combustion system, turbine means, a jet pipe, (b) a primary air stream passing directly through said compressor means, said combustion system, said turbine means, to said jet pipe, (c) a secondary air stream passing through at least a part of said compressor means and by-passing said combustion system and said turbine means, (d) an annular by-pass duct located within and co-axial with said annular casing of said by-pass turbojet, directing the remainder of said secondary air stream of said by-pass turbojet directly to said jet pipe, (e) an outer annular cowling co-axial with said turbojet casing, the forward extension of said cowling forming a single air inlet to said combined engine, (f) an annular space between said outer annular cowling and said annular casing of said by-pass turbojet, said annular space including in series flow an annular duct, an air mixing chamber, said air mixing chamber having constriction means at its upstream end adjacent said annular duct, said constriction means including a throat portion, a combustion chamber surrounding said jet pipe of said by-pass turbojet, (g) an exit nozzle terminating the downstream end of said outer annular cowling, beyond the extremity of said jet pipe, (h) a direct air stream passing through said annular duct to said mixing chamber, (i) passage means through said annular casing of said by-pass turbojet having an outlet situated between said annular duct and said air mixing chamber, directing a portion of said secondary air stream towards said constriction means in said air mixing chamber, whereby said direct air stream and said portion of said secondary air stream intimately mix in said air mixing chamber before passing into said combustion chamber, (j) afterburning means situated in said jet pipe of said by-pass turbojet.

12. Combined turbojet-ramjet comprising: (a) a by-pass turbojet, including in series flow within an annular casing, compressor means, a combustion system, turbine means, a jet pipe, (b) a primary air stream passing directly through said compressor means, said combustion system, said turbine means, to said jet pipe, (c) a secondary air stream passing through at least a part of said compressor means and by-passing said combustion system and said turbine means, (d) an annular by-pass duct located within and co-axial with said annular casing of said by-pass turbojet, directing the remainder of said secondary air stream of said by-pass turbojet directly to said jet pipe, (e) an outer annular cowling co-axial with said turbojet casing, the forward extension of said cowling forming a single air inlet to said combined engine, (f) an annular space between said outer annular cowling and said annular casing of said by-pass turbojet, said annular space including in series flow an annular duct, an air mixing chamber, said air mixing chamber having constriction means at its upstream end adjacent said annular duct, said constriction means including a throat portion, a combustion chamber surrounding said jet pipe of said by-pass turbojet, (g) an exit nozzle terminating the downstream end of said outer annular cowling, beyond the extremity of said jet pipe, (h) a direct air stream passing through said annular duct to said mixing chamber, (i) passage means through said annular casing of said by-pass turbojet having an outlet situated between said annular duct and said air mixing chamber, directing a portion of said secondary air stream towards said constriction means in said air mixing chamber, whereby said direct air stream and said portion of said secondary air stream intimately mix in said air mixing chamber before passing into said combustion chamber, (j) control means located at the extremity of said by-pass duct situated adjacent said jet pipe, adjusting the cross-sectional area of said by-pass duct at said jet pipe, (k) after-burning means situated in said jet pipe of said by-pass turbojet.

13. Combined turbojet-ramjet in accordance with claim 12, wherein said control means include: (l) articulated flaps.

14. Combined turbojet-ramjet in accordance with claim 12, wherein said control means include: (m) a longitudinally slideable annular collar.

References Cited by the Examiner
UNITED STATES PATENTS

| | | | |
|---|---|---|---|
| 2,577,919 | 12/51 | Roy | 60—35.6 |
| 2,610,465 | 9/52 | Imbert et al. | 60—35.6 |
| 2,672,726 | 3/54 | Wolf et al. | 60—35.6 |
| 2,831,627 | 4/58 | Brunner. | |
| 2,970,431 | 2/61 | Harshman | 60—39.29 X |
| 3,048,376 | 8/62 | Howald et al. | 60—35.6 |
| 3,058,302 | 10/62 | Kuzyk | 60—35.6 |
| 3,069,848 | 12/62 | Griffith | 69—35.6 |

FOREIGN PATENTS

| | | |
|---|---|---|
| 972,222 | 8/50 | France. |
| 972,223 | 8/50 | France. |
| 1,086,315 | 8/54 | France. |
| 140,860 | 6/53 | Sweden. |
| 243,957 | 2/47 | Switzerland. |

SAMUEL LEVINE, *Primary Examiner.*

JULIUS E. WEST, ABRAM BLUM, *Examiners.*